United States Patent
Hunter et al.

(10) Patent No.: US 7,602,421 B2
(45) Date of Patent: Oct. 13, 2009

(54) IMAGE CAPTURE APPARATUS AND METHOD AND METHOD WITH A REMOTE SIGNALING DEVICE

(75) Inventors: Andrew Arthur Hunter, Bristol (GB); Stephen Philip Cheatle, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 884 days.

(21) Appl. No.: 10/191,553

(22) Filed: Jul. 10, 2002

(65) Prior Publication Data

US 2003/0020811 A1 Jan. 30, 2003

(30) Foreign Application Priority Data

Jul. 27, 2001 (GB) ................... 0118458.9

(51) Int. Cl.
*H04N 5/232* (2006.01)

(52) U.S. Cl. ................... 348/211.3; 348/211.4

(58) Field of Classification Search . 348/211.99–211.4, 348/211.8, 211.13
See application file for complete search history.

(56) References Cited

U.S. PATENT DOCUMENTS

| | | | |
|---|---|---|---|
| 4,716,465 A | | 12/1987 | Meyer |
| 6,137,534 A * | | 10/2000 | Anderson ................ 348/222.1 |
| 6,188,431 B1 * | | 2/2001 | Oie ......................... 348/211.5 |
| 6,525,761 B2 * | | 2/2003 | Sato et al. ................ 348/14.04 |
| 6,556,240 B2 * | | 4/2003 | Oka et al. ............. 348/211.99 |
| 6,650,831 B1 * | | 11/2003 | Thompson ..................... 396/6 |
| 6,809,759 B1 * | | 10/2004 | Chiang .................... 348/211.2 |
| 7,139,014 B1 * | | 11/2006 | Kim et al. ................ 348/14.01 |
| 7,149,549 B1 * | | 12/2006 | Ortiz et al. .................. 455/566 |
| 2002/0005907 A1 * | | 1/2002 | Alten .................... 348/333.11 |
| 2002/0049728 A1 * | | 4/2002 | Kaku ............................ 707/1 |
| 2002/0054224 A1 * | | 5/2002 | Wasula et al. ............... 348/232 |

FOREIGN PATENT DOCUMENTS

JP 10-301196 11/1998

* cited by examiner

*Primary Examiner*—Timothy J Henn

(57) ABSTRACT

Image capture apparatus whereby a narrow beam infra-red transmitter (10) and a short range radio receiver (12) are mounted within a personal digital camera (14). A push-button mechanism (16) is provided on the outer cover of the camera (14) to activate the transmitter (10) when required. An environmental camera (18) is provided with a narrow beam infra-red receiver (20) and a short range radio transmitter (22). In the case whereby, for example, a user wishes to capture an image of themselves using the environment camera (18), they can simply position themselves within the camera's field of view (26), point the digital camera (14) at the camera (18) and press the push-button mechanism (16) causing the transmitter (10) to transmit an image capture request signal (28) to the security camera (18). The captured image is transmitted via a short range transmitter (22) to the user's personal camera (14) where it is received by the receiver (12).

27 Claims, 3 Drawing Sheets

IMAGE CAPTURE APPARATUS AND METHOD AND METHOD WITH A REMOTE SIGNALING DEVICE

FIELD OF THE INVENTION

This invention relates to image capture generally and, more particularly, to a novel apparatus and method for capturing still and/or moving images within the environment.

BACKGROUND TO THE INVENTION

It is well known to use personal digital cameras, video cameras, etc. to capture images within the environment for storage and future viewing. Such image capture devices are generally carried by the user and are able to capture images substantially from the user's viewpoint, as required. However, the field of view of such devices is limited by the positions and standpoints available to the user, and in some cases it may be required to capture images which are not actually visible or accessible to the user. Further, in many cases, it is difficult for a camera user to capture an image of themselves without the assistance of another party. In addition, although personal cameras tend to combine photographic sensing with the capture of sensed images in a digital storage medium, and even though many of these cameras have removable storage cards, such cards generally need to be plugged into the camera to which they belong before they can be used to capture images.

Japanese patent application number JP10301196A describes a personal camera having a detachable remote control device which has an image display and a wireless link to receive and show viewfinder images within the camera field of view. However, the remote control is only suitable for use with the specific camera with which it is associated.

On the other hand, there are many different types of environmental and surveillance cameras in use, such as security cameras and the like, which are often mounted in relatively high positions giving them a wide field of view from a viewpoint which is generally inaccessible to a personal camera user. This type of camera does not generally combine sensing and storage and captured images tend to be stored remotely from the camera. Unfortunately, however, the images captured by such environmental cameras are not usually available to the general public and may only be accessed by the camera provider or their agent(s). Even if the images are available via a personal computer or the like, or even to the general public via the Internet, users still have to find the personal computer to which the environmental camera of interest is connected (assuming, of course that it is accessible to a member of the general public) or identify the URL of the website at which images captured by the environmental camera in question can be viewed, neither of which options are necessarily easy.

We have now devised an arrangement which seeks to overcome the problems outlined above.

SUMMARY OF THE INVENTION

Image capture apparatus, comprising a portable signalling device for transmitting a signal to a remote image capture device to cause said remote image capture device to capture one or more still or moving images, said signal being transmitted to said image capture device in response to a triggering action or instruction by a user, said image capture device being selected by direction (manual or otherwise) of said signal and/or said signalling device towards said image capture device, receiving apparatus for receiving a signal including image data representative of said image(s) from said remote image capture device and storage or display apparatus for storing and/or displaying said received image data, at least one of said signal from said portable signalling device and said signal from said remote image capture device including data determining or specifying the location at which a captured image can be viewed and/or retrieved.

A method of capturing an image, the method comprising the steps of triggering or instructing a portable signalling device to transmit a signal to a remote image capturing device to cause said remote image capture device to capture an image, said remote image capture device being selected by directing (manually or otherwise) the portable signalling device and/or the signal transmitted thereby towards said image capture device, transmitting image data representative of said image captured by said remote image capture device to said remote storage and/or display device, and transmitting a signal, either from said signalling device to said remote image capture device, or from said remote image capture device to said signalling device, the signal including data determining or specifying the location at which said captured image(s) can be or are to be retrieved and/or viewed.

Thus, one aspect of the present invention provides a method and apparatus whereby a user can transmit a signal to a chosen environmental (still or video) camera or the like to cause it to a capture one or more images according to its field of view, image data representative of the captured image(s) then being transmitted to a remote storage and/or display means for storage and/or display as required. The storage and/or display means may be mounted in or on a personal still or video camera, a personal digital assistant (PDA) or a mobile telephone for example. Alternatively, the image data may be transmitted to a central storage area, such as a website or the like, in which case, the user preferably receives details of how to retrieve the image when required (e.g. the website URL).

In yet another embodiment, the signalling device may be adapted to request storage of captured images in a specific location (for example, an internet-accessible storage area owned by the user), in which case the environmental camera may simply send a confirmation signal to the signalling device to confirm that the requested image(s) have been captured and saved.

In the case of video image capture in particular, the signalling means and/or the storage/display means may be adapted to capture audio data to accompany images captured by an environmental camera if, for example, these are closer to the user of the apparatus.

It will be appreciated that environmental cameras and the like potentially provide for a much greater range of camera heights and positions, thereby greatly improving the range of images available for capture by an individual. The present invention allows individuals to conveniently capture still and/or moving images taken by environmental cameras as well as, or instead of, using a personal camera.

In one embodiment of the present invention, the signalling means is mounted in or on a user's personal still or video camera. However, this function may be provided in a separate portable device such that the user does not need to have their camera with them to capture an image via an environmental camera if desired. The signalling device may be made simple and cheap enough to be given or rented to, for example, visitors to a desired location such as a theme park. This is particularly useful if the image data is stored in a separate device. In this case, the signalling device may be arranged to transmit user identity information to the selected environmental camera so that user-specific images can be stored for subsequent viewing. The same signalling device could be arranged to transmit the user identity information to a public viewing device or the like, so that the user-specific images can be viewed or reviewed prior to deletion, print or purchase. In fact, if the user carries a signalling device and the image data is transmitted directly to a central storage area, such as a website, the user does not even have to have a personal camera. In one preferred embodiment of the present invention, the signalling and image data (or URL) receiving means are provided in a unitary device which may be mounted in or on a personal camera, or which may comprise a stand-alone device.

In a preferred embodiment, the signalling means comprises an infra-red transmitter or the like, which can be manually directed at the environmental camera from which it is required to obtain an image. The signalling means may comprise a narrow-beam infra-red transmitter or the like to enable a user to select a specific environmental camera by positioning the signalling device at it, but this is not essential. The apparatus may be adapted such that the environmental camera required to be used can be selected from a wide range of different angles. The apparatus of the present invention preferably also comprises a radio receiver for receiving image data representative of an image captured by the chosen environmental camera. The infra-red transmitter (or similar signalling means) is beneficially activated by means of a push-button or switch which is beneficially manually actuable by the user.

The signal requesting an image from the environmental camera preferably includes not only the request but sufficient information regarding the signalling means for the resultant image or video stream to be sent back from the intitiating device. Of course, the environmental camera will also have receiving means for receiving an processing the image capture request. Particularly (but not exclusively) in the case of video image capture, the apparatus may be adapted to provide the user with the option to preview images prior to capture (for example, means may be provided to allow a user to select to zoom in, zoom out or pan from a particular subject to a close-up of the user), in which case, the signalling means may be arranged to include in the image capture request signal to the selected environmental camera information representing selected parameters etc.

Obviously, if the signalling means is an infra red transmitter, then the receiver in or on the environmental camera will be an infra red receiver. In response to the request, the environmental camera captures an image and sends it to whatever storage and/or display means being employed, preferably by means of short range radio or the like (so that alignment and line-of-sight between the environmental camera and the apparatus need not be maintained during transfer of the image data. As stated above, the transmitter in or on the environmental camera may transmit image data representative of the captured image directly to the user's device or storage and/or display, or it may send the image data to a central storage area, such as a website via an Internet link or the like, and transmit to the user's device only the URL of the website at which the image can be accessed. It will be appreciated that there may be a time delay before the requested image capture occurs. Thus, in a preferred embodiment, means may be provided on the environmental camera and/or signalling device for indicating one or more of the feedback of the capture request, progress of a time delay, the moment of image capture etc. Such indicating means may comprise, for example, visual means (such as an LED or the like) on the environmental camera and/or audio, visual or tactile means in or on the signalling device.

The signalling device may include display means (separate from the main storage and/or display means) to which the image data may be transmitted so that a user can preview (before image capture) and/or review (after image capture) images. The image data transmitted to the display means in the signalling device, in this case, may be at a lower resolution than that transmitted to the main storage and/or display means. For example, an environmental camera may store a full resolution image for later retrieval via, say, the internet but may also transmit a (possibly lower resolution) version to the signalling device to permit the user to view the resultant image on a (small) display means provide therein.

Another aspect of the present invention provides image capture apparatus, comprising a remote control device for transmitting a signal to a selected remote camera to cause said camera to capture one or more still or moving images, said camera being selected by direction of the remote control toward the selected remote camera, wherein said one or more still or moving images captured by said camera are transmitted to a central storage location, said camera including a transmitter for transmitting to the remote control data representative of how to retrieve/view said one or more captured images via said central storage location.

Yet another aspect of the present invention provides image capture apparatus, comprising a portable control device for transmitting a signal to a remote camera selected by direction of the portable control device toward a chosen camera, said signal including data representative of storage or viewing apparatus in or on which one or more images captured by said camera are required to be stored or viewed, said camera being arranged in response to said signal, to capture one or more still or moving images and transmit said images to said storage or viewing apparatus, wherein said portable control device is adapted to control one or more camera selected from a plurality of cameras.

A still further aspect of the present invention provides an imaging system comprising a plurality of cameras and a plurality of remote control devices, wherein each of said remote control devices is capable of transmitting a signal to a selected one of said plurality of cameras, in response to receipt of said signal, said selected camera is adapted to capture one or more still or moving images and transmit image data representative of said one or more captured images to a specified remote storage or viewing device.

Other objects and aspect of the present invention will become apparent to a person skilled in the art from the following description.

BRIEF DESCRIPTION OF THE DRAWINGS

An embodiment of the present invention will now be described by way of example only and with reference to the accompanying drawings, in which.

DETAILED DESCRIPTION OF THE INVENTION

Figure 1:
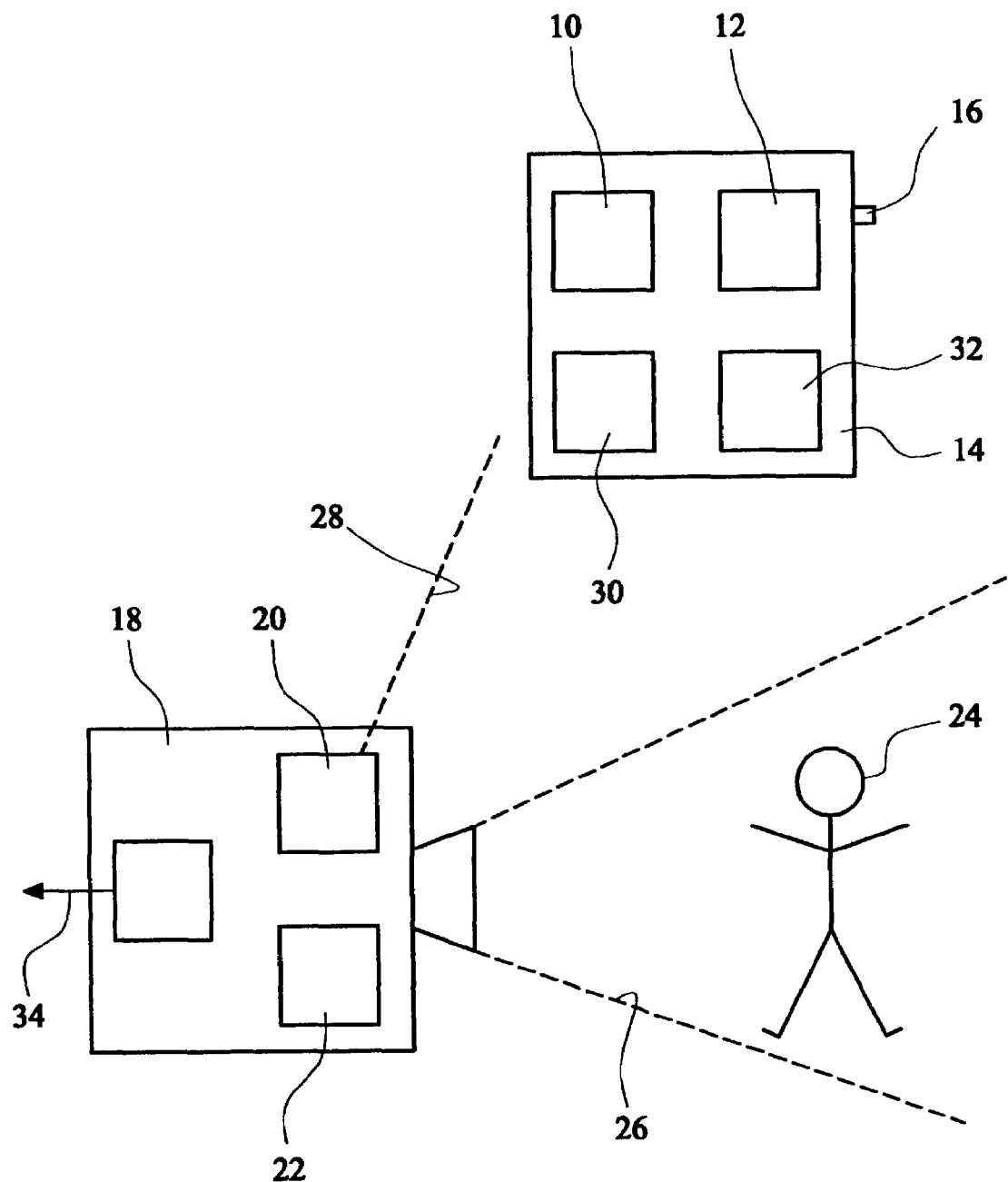
FIG. 1 is a schematic block diagram of apparatus according to an exemplary embodiment of the invention.

Referring to FIG. 1, apparatus according to an exemplary embodiment of the present invention comprises a narrow beam infra red transmitter 10 and a short range radio receiver 12 mounted within a personal digital camera 14. A push button mechanism 16 is provided on the outer cover of the camera 14 to activate the transmitter 10 when required.

An environmental camera 18, such as a security camera within a tourist attraction, is provided with a narrow beam infra red receiver 20 and a short range radio transmitter 22.

Consider, for example, the situation whereby a visitor 24 to the tourist attraction wishes to capture an image of themselves. The visitor 24 locates a security camera 18 mounted in a suitable location and positions themselves within the camera's field of view 26. The visitor 24 then points the digital camera 14 at the camera 18 and presses the push button mechanism 16 causing the transmitter 10 to transmit an image capture request signal 28 to the security camera 18. The receiver 20 in the security camera 18 receives the request signal 28 and captures an image of the visitor 24 accordingly. The image is then transmitted via the short range transmitter 22 to the user's personal camera 14 or other specified location.

Image data received by the user's camera 14 may be stored in a local storage means 30 and/or displayed on a local display screen 32, as required.

Alternatively, the image captured by the security camera 18 may be transmitted via a communications link 34 to a central storage area (not shown), such as a website or the like, the URL of which is transmitted by the short range radio transmitter 22 in the security camera 18 to the visitor's personal camera 14, where it is received by the receiver 12. The URL may once again be stored in a local storage means 30 and/or displayed on a local display screen 32, as required.

Figure 2A:
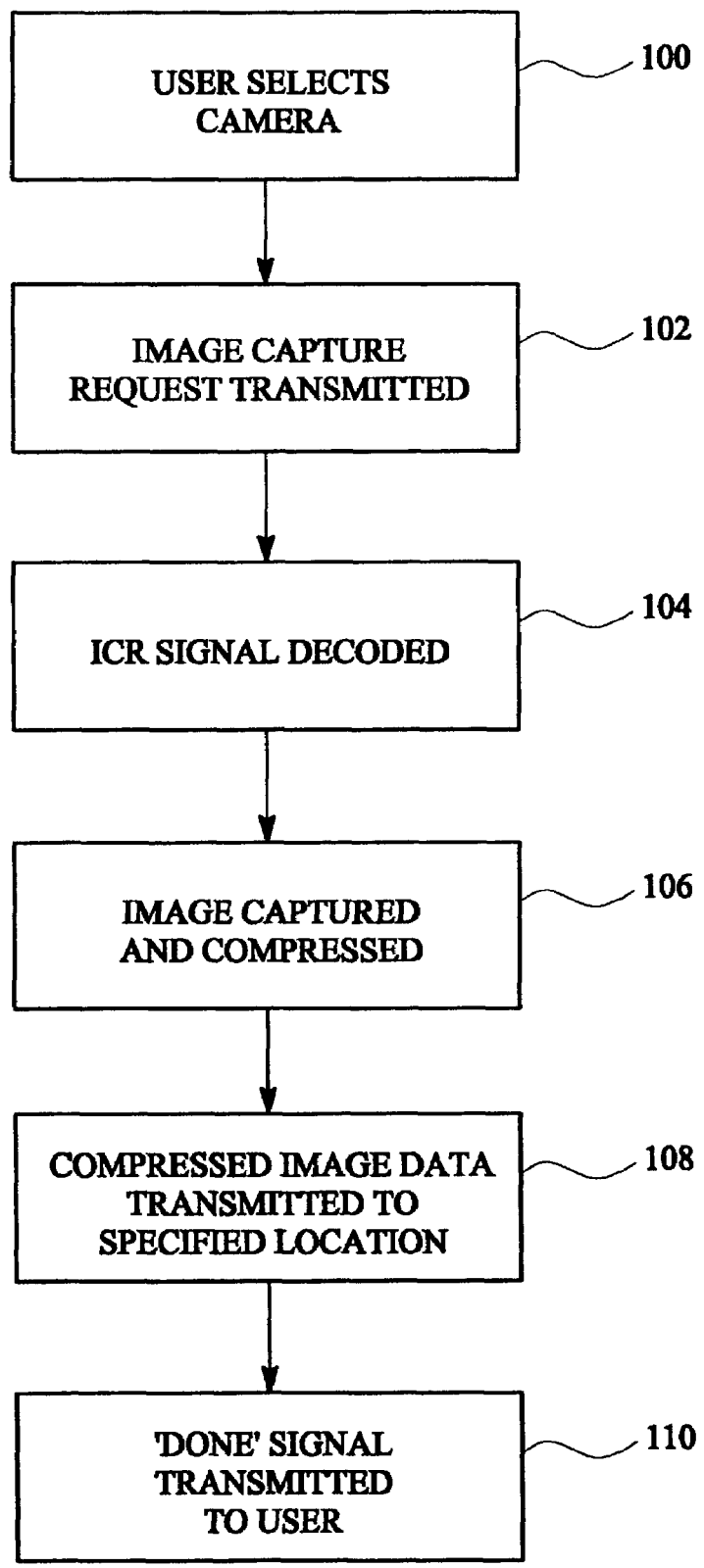
FIG. 2A is a flow diagram illustrating a first exemplary method of operation of the apparatus of FIG. 1.

In more detail, and referring to FIG. 2A of the drawings, a flow diagram of a first exemplary method of operation of the apparatus of FIG. 1 is illustrated. As shown, at step 100, a user 24 selects a camera 18 and points their digital camera 14 at it, such that the transmitter 10 on the digital camera 14 and the receiver 20 on the selected camera 18 are substantially in line with each other. The user 24 then presses the push-button mechanism 16 on their digital camera 14 which causes an image capture request signal 28 to be transmitted by the transmitter 10 to the receiver 20 (at step 102). The image capture request signal may, in one embodiment of the invention, include data indicating the location to which any captured image is required to be transmitted for storage and/or viewing.

At step 104, the camera 18 receives the image capture request signal 28 and decodes it. The camera 18 then captures at step 106, the image currently within its field of view, and compresses the image data.

At step 108, the compressed image data is transmitted (via the transmitter 22) to the location specified by the image capture request signal, for storage and/or viewing. This may conveniently, but not necessarily, be housed within the user's digital camera 14. The camera 18 may then also transmit (at step 110) a signal to the user's digital camera 14 indicating that the requested operation has been completed.

Figure 2B:
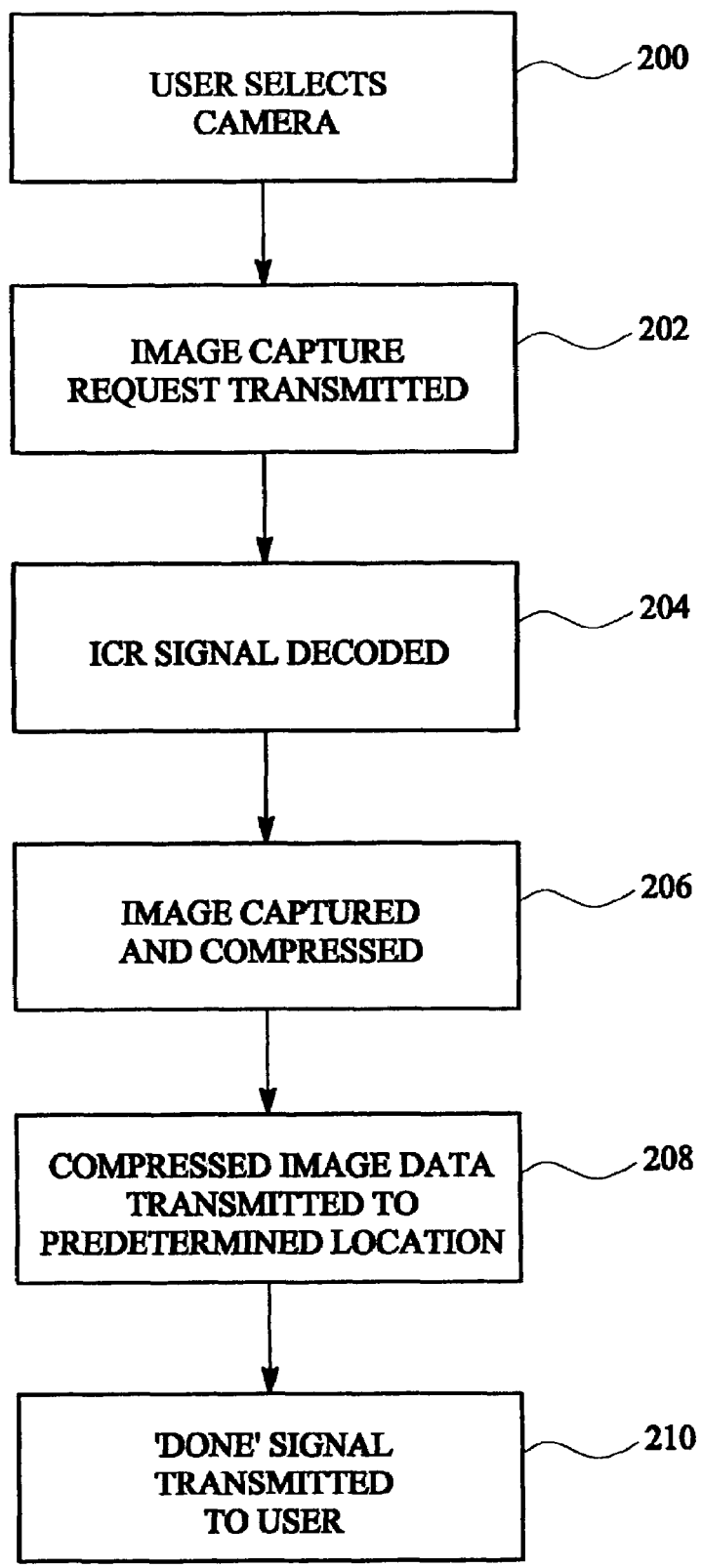
FIG. 2B is a flow diagram illustrating a second exemplary method of operation of the apparatus of FIG. 1.

In another exemplary embodiment, and referring to FIG. 2B of the drawings, the user 24 may once again select (at step 200) a camera 18 and point their digital camera 14 at it, such that the transmitter 10 on the selected camera 18 are substantially in line with each other. The user 24 then presses the push-button mechanism 16 on their digital camera 14 and causes an image capture request signal 28 to be transmitted by the transmitter 10 to the receiver 20 (at step 202), as before. However, in this case, the image capture request signal does not include data indicating the location to which any captured image is required to be transmitted for storage and/or viewing. Instead such location is a storage/viewing location predetermined by the selected camera 18.

Once again, at step 204, the camera 18 receives the image capture request signal 28 and decodes it, and then captures, at step 206, the image currently within its field of view and compresses the image data.

At step 208, the compressed image data is transmitted to the predetermined storage/viewing location. The selected camera 18 then transmits (at step 210), via the transmitter 22, a signal to the user's digital camera 14 indicating that the requested operation has been completed, the signal including data indicating the location at which the captured image can be viewed and/or stored, and/or data indicating how the image can be retrieved or accessed at or from the predetermined location.

It will be appreciated from the foregoing that the present invention has, as one of its primary considerations, the issue of remote control of selected one or more cameras to which a user may not normally have access. Thus, one of the advantages of the present invention is that the remote control or signalling devices and cameras are largely independent, such that one signalling device can operate several different cameras, and many different signalling devices can be used to control a single camera. This functionality is achieved by the ability either of the camera to specify to the remote control where its captured images are stored or available for viewing or of the remote control device to specify to a selected camera where the images captured thereby are to be stored or available for viewing.

In the foregoing specification, the invention has been described with reference to specific exemplary embodiments thereof. It will, however, be apparent to a person skilled in the art that various modifications and changes may be made thereto without departing from the broader spirit and scope of the invention as set forth in the appended claims. Accordingly, the specification and drawings are to be regarded in an illustrative, rather than a restrictive, sense.

The invention claimed is:

1. An image system comprising:
    at least one image capture apparatus; and
    at least one remote image capture device comprising a transmitter;
    each at least one image capture apparatus comprising:
        a portable signalling device for transmitting a signal to a respective of the at least one remote image capture device to cause said remote image capture device to capture one or more still or moving images, said signal being transmitted to said image capture device in response to a triggering action or instruction by a user, said image capture device being selected by direction of said signal and/or said signalling device towards said image capture device;
        receiving apparatus for receiving a signal including image data representative of said image(s) from said remote image capture device; and
        storage or display apparatus for storing and/or displaying said received image data, at least one of said signal from said portable signalling device and said signal from said remote image capture device including data determining or specifying the location at which a captured image can be viewed and/or retrieved,
    wherein said signalling device is arranged to include in said image capture request signal transmitted to said remote image capture device a request for said image data to be transmitted to a specified storage and/or display apparatus, said remote image capture device configured to cause said transmitter to transmit a confirmation signal to said signalling device after said image(s) have been captured and said image data has been transmitted to said specified storage and/or display apparatus.

2. Image system according to claim 1, wherein the storage or display apparatus is mounted in or on a personal digital or video camera separate from the remote image capture device.

3. Image system according to claim 1, wherein the image data is transmitted to a central storage area and/or is stored in said remote image capture device, and details of how to retrieve the image when required are transmitted to the signalling device.

4. Image system according to claim 1, wherein the signalling device is mounted in or on a user's personal still or video camera, personal digital assistant (PDA), or mobile telephone.

5. Image system according to claim 4, wherein the signalling device is mounted in or on a user's personal still or video camera.

6. Image system according to claim 1, wherein the signalling device includes an infra-red transmitter which can be manually directed at the remote image capture device from which it is required to obtain a captured image.

7. Image system according to claim 6, wherein the transmitter is activated by means of a push-button or switch.

8. Image system according to claim 1, wherein said signalling device is adapted to include user identity data in said signal transmitted to said remote image capture device.

9. Image system according to claim 8, wherein said signalling device is additionally adapted to transmit said user identity data to a remote viewing device in which captured images corresponding to said user identity can be viewed.

10. Image system according to claim 1, wherein said signalling device includes display apparatus and said remote image capture device is arranged to transmit said image data to said signalling device for display on said display apparatus.

11. Image system according to claim 10, each at least one image capture apparatus comprising main storage and/or display apparatus, wherein said image data is transmitted to both said signalling device and said main storage and/or display apparatus.

12. Image system according to claim 11, wherein said image data is transmitted at a lower resolution to said signalling device than to said main storage and/or display apparatus.

13. Image system according to claim 1, each at least one image capture apparatus comprising audio data capture apparatus for capturing audio data to accompany said image data.

14. Image system according to claim 13, wherein said remote image capture device comprises audio data capture apparatus for capturing audio data and an audio data transmitter for transmitting said audio data to said storage and/or display apparatus.

15. Image system according to claim 13, wherein said signalling device and/or said storage and/or display apparatus comprises audio data capture apparatus for capturing audio data.

16. Image system according to claim 1, each at least one image capture apparatus comprising an indicator for indicating one or more of receipt of image capture request signal by said remote image capture device, estimated or expected time delay between image capture request and image capture, and the moment at which image capture takes place.

17. Image system according to claim 1, each at least one image capture apparatus comprising preview apparatus on which a user can preview images prior to capture thereof.

18. Image system according to claim 17, each at least one image capture apparatus adapted to allow a user to alter or adapt parameters of an image within the field of view of said remote image capture device prior to capture of said image.

19. Image system according to claim 18, wherein said signalling device is arranged to include in said signal transmitted to said remote image capture device data specifying one or more parameters of the image to be captured.

20. Image system according to claim 1, each at least one image capture apparatus comprising a radio receiver for receiving image data representative of an image captured by the remote image capturing device.

21. Image system according to claim 1, wherein said signal transmitted to said image capture device in response to a triggering action or instruction by a user is a directional signal.

22. A method of capturing an image, the method comprising the steps of:
triggering or instructing a portable signalling device to transmit a signal to a remote image capturing device to cause said remote image capture device to capture an image, said remote image capture device being selected by directing the portable signalling device and/or the signal transmitted thereby towards said image capture device;
transmitting image data representative of said image captured by said remote image capture device to said remote storage and/or display device;
transmitting a signal, either from said signalling device to said remote image capture device, or from said remote image capture device to said signalling device, the signal including data determining or specifying the location at which said captured image(s) can be or are to be retrieved and/or viewed, wherein said image capture request signal transmitted to said remote image capture device includes a request for said image data to be transmitted to a specified storage and/or display apparatus; and
transmitting a confirmation signal to said portable signalling device from said remote image capture device after said image(s) have been captured and said image data has been transmitted to said specified storage and/or display apparatus.

23. Method according to claim 22, said signal transmitted to said remote image capturing device from said portable signalling device being a directional signal.

24. A method of capturing an image, the method comprising the steps of:
triggering or instructing a portable signalling device to transmit a signal to a remote image capturing device to cause said remote image capture device to capture an image, said remote image capture device being selected by directing the portable signalling device and/or the signal transmitted thereby towards said image capture device;
transmitting image data representative of said image captured by said remote image capture device to said remote storage and/or display device;
transmitting a signal, either from said signalling device to said remote image capture device, or from said remote image capture device to said signalling device, the signal including data determining or specifying the location at which said captured image(s) can be or are to be retrieved and/or viewed,
wherein said data determining or specifying the location at which said captured image(s) are to be retrieved and/or viewed is included in said signal transmitted from the portable signalling device to the selected remote image capturing device to cause it to capture one or more still or moving images, wherein said image capture request signal transmitted to said remote image capture device includes a request for said image data to be transmitted to a specified storage and/or display apparatus; and transmitting a confirmation signal to said portable signalling device from said remote image capture device after said image(s) have been captured and said image data has been transmitted to said specified storage and/or display apparatus.

25. An image system comprising:
at least one image capture apparatus; and
at least one remote camera comprising a transmitter;
each at least one image capture apparatus comprising:
   a remote control device for transmitting a signal to a selected remote camera of the at least one remote cameras to cause said camera to capture one or more still or moving images, said camera being selected by direction of the remote control toward the selected remote camera, where said one or more still or moving images captured by said camera are transmitted to a central storage location, said camera including a transmitter for transmitting to the remote control data representative of how to retrieve/view said one or more captured images via said central storage location,
wherein said remote control device is arranged to include in said image capture request signal transmitted to said selected remote camera a request for said one or more images to be transmitted to a specified storage and/or display apparatus, said selected remote camera configured to cause said transmitter to transmit a confirmation signal to said remote control device after said one or more images have been captured and said one or more images have been transmitted to said specified storage and/or display apparatus.

26. An image system comprising:
at least one image capture apparatus; and
at least one remote camera comprising a transmitter;
each at least one image capture apparatus, comprising:
   a portable control device for transmitting a signal to a remote camera of the at least one remote cameras selected by direction of the portable control device toward a chosen camera, said signal including data representative of storage or viewing apparatus in or on which one or more images captured by said camera are required to be stored or viewed, said camera being arranged in response to said signal to capture one or more still or moving images and transmit said images to said storage or viewing apparatus, wherein said portable control device is adapted to control one or more cameras selected from a plurality of cameras,
wherein said portable control device is arranged to include in said image capture request signal transmitted to said selected remote camera a request for said one or more images to be transmitted to a specified storage and/or display apparatus, said selected remote camera configured to cause said transmitter to transmit a confirmation signal to said portable control device after said one or more images have been captured and said one or more images have been transmitted to said specified storage and/or display apparatus.

27. An image system comprising:
a plurality of cameras and a plurality of remote control devices, wherein each of said remote control devices is configured to transmit a signal to any one of said plurality of cameras to select a selected one of said plurality of cameras out of said plurality of cameras, said signal to said selected one of said plurality of cameras being a directional signal, in response to receipt of said signal, said selected camera is adapted to capture one or more still or moving images and transmit image data representative of said one or more captured images to a specified remote storage or viewing device,
wherein each of said remote control devices is arranged to include in said image capture request signal transmitted to a respective selected remote camera a request for said one or more images to be transmitted to a specified storage and/or display apparatus, said respective selected camera comprising a transmitter, said respective selected camera configured to cause said transmitter to transmit a confirmation signal to its respective remote control device after said one or more images have been captured and said one or more images have been transmitted to said specified storage and/or display apparatus.

* * * * *